Dec. 17, 1935.  J. R. KONETSKY  2,024,528
MEANS FOR MOUNTING VEHICLE FRAMES
Filed Nov. 12, 1934
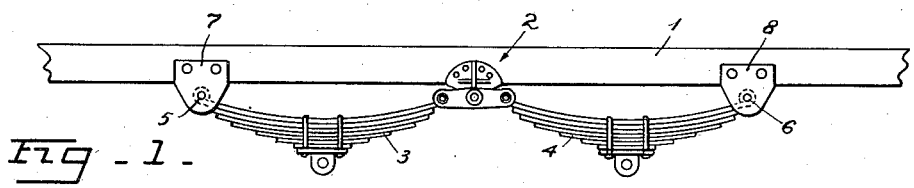
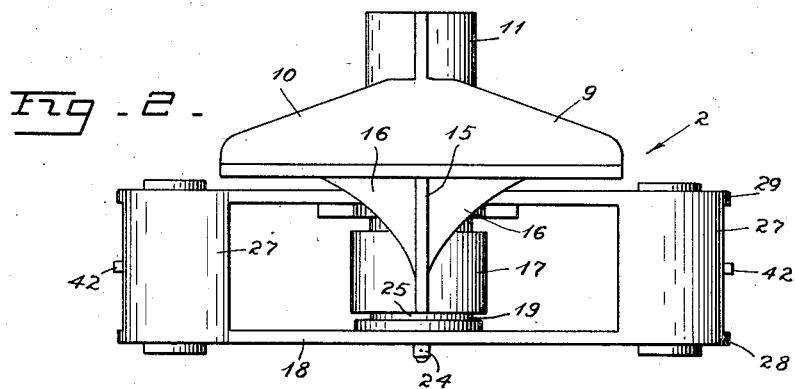
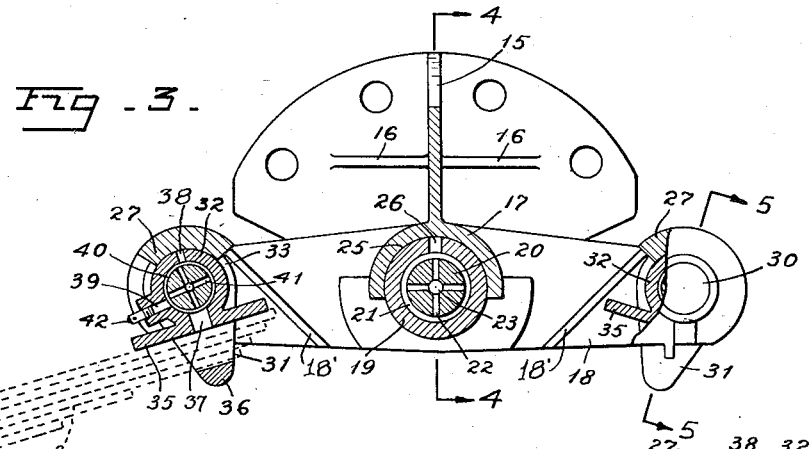
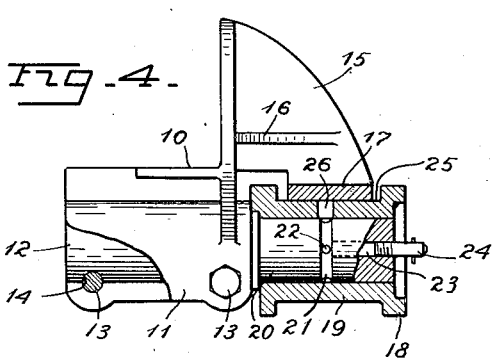
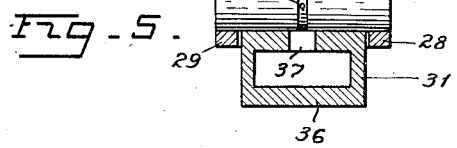
INVENTOR.
JOHN R. KONETSKY
BY
ATTORNEYS.

Patented Dec. 17, 1935

2,024,528

UNITED STATES PATENT OFFICE 2,024,528

MEANS FOR MOUNTING VEHICLE FRAMES

John R. Konetsky, San Francisco, Calif.

Application November 12, 1934, Serial No. 752,772

6 Claims. (Cl. 267—54)

My invention relates to improvements in means for mounting vehicle frames, and it consists of the combinations, constructions, and arrangements hereinafter described and claimed.

An object of my invention is to provide an improvement over my patented device, No. 1,886,557 issued November 8, 1932, and an improvement over my spring hanger application, Serial No. 745,996 filed September 28, 1934. In the patented device I show a circular casting rocking in a circular bearing and having a flat plate slidably bearing against the end of a leaf spring. The flexing of the leaf spring causes the casting to rock in the bearing, and also causes the flat plate to slide on the end of the spring.

In my copending application I show a circular casting mounted on a pin and having a flat plate slidable on the end of a leaf spring.

In the present form of the device I combine the two above features because I have found that in truck construction the wear is so severe on the spring connections that an additional bearing surface must be provided. I therefore provide a circular casting rotatable on a pin, and I further provide this casting rotatable in a bearing surface. These two combined bearing surfaces give greater supporting area for the casting, and the result is that the life of the device is materially increased.

I further provide novel means for lubricating the pin, the bearing surface between the casting, and the curved plate which it bears against, and also the bearing surface between the plate carried by the casting and the end of the leaf spring. The lubricating of the three surfaces is accomplished from one feeding.

In addition to the above I provide a frame for carrying two of the circular castings, and this frame is rockably supported on a bracket, and the connection between the bracket and the frame consists of a sleeve on the frame rotating on a pin carried by the bracket, the sleeve also bearing against the curved bearing plate. In this way a double bearing surface is provided between the frame and the bracket, namely, the pin and the curved bearing surface. Novel lubricating means is used for feeding a lubricant to the pin and the curved bearing plate carried by the bracket.

The device is extremely simple in construction and provides the greatest amount of bearing surface for the leaf spring connections.

Other objects and advantages will appear in the following specification and the novel features of the device will be particularly pointed out in the appended claims.

My invention is illustrated in the accompanying drawing forming a part of this application, in which—

Figure 1 is a side elevation showing my device operatively applied to a truck chassis and illustrating how the device is connected to the adjacent ends of two leaf springs;

Figure 2 is a top plan view of the device;

Figure 3 is a front elevation of the device, portions being shown in section;

Figure 4 is a section substantially along the line 4—4 of Figure 3; and

Figure 5 is a section along the line 5—5 of Figure 3.

In carrying out my invention I make use of a chassis 1 to which my device indicated generally at 2 is secured. Leaf springs 3 and 4 have their adjacent ends slidably connected to the member 2 in a manner hereinafter described, and have their opposite ends connected at 5 and 6 to brackets 7 and 8, which, in turn, are secured to the chassis 1. The member 2 is so designed that a flexing of either of the leaf springs 3 and 4, or of both of the springs, will cause their inner ends to slide with respect to the member 2 and to transmit their motion to each other, as will be hereinafter fully described.

The member 2 comprises a bracket indicated generally at 9, and this bracket has an L-shaped seat 10, see Figure 4, for receiving a channel iron of the chassis 1. The bracket 9 also has a split sleeve 11, and this sleeve receives a pin 12. Figure 4 shows how the pin is held against rotation by bolts 13 that are passed through the split portion of the sleeve, and are received in grooves 14 in the pin 12. The bolts 13 not only prevent rotation of the pin 12 but clamp the sleeve tightly around the pin.

Figures 3 and 4 also show the bracket 9 as having a vertical fin 15 reinforced by ribs 16, and the fin 15 carries a curved bearing member 17. Figure 3 shows this curved bearing member 17 as being in the shape of a half circle.

A frame indicated generally at 18 is rotatably carried by the bracket 9. The frame has a sleeve 19, see Figures 3 and 4, that is rotatably mounted on a reduced portion 20 of the pin 12. This reduced portion has a circumferential oil groove 21 therein with radially extending oil passages 22 leading from a central bore 23. The end of the bore 23 is closed by a grease gun fitting 24.

Figures 3 and 4 also show how the outer upper surface 25 of the sleeve 19 bears against the inner surface of the curved bearing member 17. In this way the curved bearing member 17 cooperates with the reduced portion 20 of the pin for carrying the load. An opening 26 extends through the top of the sleeve 19 and places the circumferential oil groove 21 in communication with the curved bearing member 17 of the outer surface 25 of the sleeve 19. In this way the lubricant fed into the passageway 23 by means of the lubricant fitting 24 is conveyed through the radial passages 22 to the oil groove 21, and from there the lubricant is conveyed through the passage 26 to the abutting surfaces of the bearing member 17 and the outer surface 25. The reduced portion 20 is lubricated in this manner, and so likewise is the surface 25.

I provide two spring hangers and dispose these at the ends of the frame 18. Since both of these are identical to each other, a description of one will suffice for both. Figure 5 shows how the end of the frame 18 has a curved portion 27 with a downwardly extending projection 28 that cooperates with the rear wall 29 of the frame 18 for supporting the pin 30. A spring hanger indicated generally at 31 has a cylindrical portion 32 for rotatably receiving the pin 30. The ends of the cylindrical portion 32 carry circular ribs 33, and these are rotatably received in arcuate grooves 34 in the curved portion 27. The curved portion 27 has its central part bearing against the cylindrical portion 32 of the spring hanger 31. Beneath the cylindrical portion 32 I dispose a bearing plate 35, and Figure 3 shows how this plate rides on the end of the leaf spring 3. The hanger 31 has a looped portion 36 for encircling the end of the leaf spring 3, for preventing the hanger from becoming disconnected from the leaf spring. An opening 37 for a lubricant extends through the plate 35, and communicates with the interior of the cylindrical portion 32. The cylindrical portion 32 has an opening 38, for lubricant, and this lubricant will be conveyed to the abutting surfaces between the curved portion 27 and the cylindrical portion 32.

Figure 3 also shows a passage 39 for lubricant, in the cylindrical portion 32, and this passage communicates with an annular groove 40 in the pin 30. Diametrically extending openings 41 in the pin 30 have their ends terminating in the groove 40. A lubricant fitting 42, see Figure 3, is disposed in the outer end of the passage 39. It will be seen from this that a lubricant forced into the passage 39 will pass into the groove 40, and then through the openings 37 and 38. In this way the pin 30 is lubricated, and so is likewise the outer surface of the cylindrical portion 32 and the under surface of the plate 35.

From the foregoing description of the various parts of the device, the operation thereof may be readily understood.

The member 2 is mounted on the chassis 1 in the manner shown in Figure 1, and then the adjacent ends of the leaf springs 3 and 4 are inserted in their respective spring hangers 31 and the spring hangers are connected to the ends of the frame 18 by the pins 30. All of the parts are lubricated in the manner already described, and the device is ready for use. If the spring 3, for example, is flexed upwardly the movement will be transmitted to the left hand end of the frame 18 in Figure 3, due to the connection of the spring 3 with the spring hanger 31. This will cause the frame 18 to swing in a clock-wise direction. The right-hand end of the frame will therefore be moved downwardly, and the spring 4 will help in absorbing the shock. In like manner the spring 3 will help in absorbing the shock of the flexing applied to the spring 4. In this simple way the frame 18 transmits the force from one spring to the other.

The principal feature of the device is the great bearing surface afforded by the pins and the arcuate bearing plates. All of this great bearing surface is lubricated from one point.

It is obvious that the spring hanger 32, pin 30, and bearing plate 27 can be attached to either end of a leaf spring and may be secured directly to a chassis frame instead of to the frame 18 as shown. The frame 18 carries ribs 18' that act as stops for the loops 36 and prevent the swinging of the spring hangers 32 beyond a predetermined point. In this way the ends of the leaf springs are prevented from pulling free of the loops 36.

While I have shown only the preferred form of my invention it should be understood that various changes or modifications may be made within the scope of the appended claims without departing from the spirit of the invention.

I claim:

1. In a spring support for vehicles, a bracket having a pin and an arcuate bearing plate concentric with the axis of the pin and being spaced from the pin, a frame for springs having a sleeve rotatable on the pin and bearing against the plate, a flat bearing plate carried by the frame and designed to ride on an end of a leaf spring, and common means for lubricating the pin and the bearing plate.

2. In a spring support for vehicles, a bracket having a pin and an arcuate bearing plate concentric with the axis of the pin and being spaced from the pin, and a frame for springs having a sleeve rotatable on the pin and bearing against the plate, pins carried by the ends of the frame, arcuate bearing plates concentric with and spaced from said last named pins, and spring hangers rotatable on said last named pins and bearing against their associate plates.

3. In a spring support for vehicles, a bracket having a pin and an arcuate bearing plate concentric with the axis of the pin and being spaced from the pin, a frame for springs having a sleeve rotatable on the pin and bearing against the plate, pins carried by the ends of the frame, arcuate bearing plates concentric with and spaced from said last named pins, spring hangers rotatable on said last named pins and bearing against their associate plates, and common means for each pin and associate bearing plate for lubricating both.

4. In a spring hanger support for vehicles, a bracket having a pin and an arcuate bearing plate concentric with and spaced from the pin, a frame for springs having a sleeve rotatable on the pin and bearing against the sleeve, a flat bearing plate carried by the frame and designed to ride on an end of a leaf spring, said pin having an axial bore, radial passageways leading from the bore, said pin having an annular groove communicating with the outer ends of all of the passageways, said sleeve having a passageway leading from the annular groove to the arcuate bearing plate, and a second passageway leading from the annular groove to the flat bearing plate and a fitting for the axial bore for admitting a lubricant thereinto, whereby the pin and bearing plate are lubricated.

5. In a spring hanger, a frame, a pin carried thereby, an arcuate plate carried by the frame and being concentric with the pin and spaced therefrom, a spring supporting casting rotatable on the pin and bearing against the plate, a flat plate carried by the casting, said pin having an annular groove therein, said casting having a passage for leading a lubricant to the groove, a second passage for conveying the lubricant from the groove to the arcuate plate, and a third passage for causing the lubricant to pass to the flat plate, whereby the pin, arcuate plate, and flat plate are lubricated from a common source.

6. The combination with a vehicle chassis, of a bracket secured thereto, said bracket having a pin and an arcuate bearing plate concentric with the pin and being spaced therefrom, a frame having a sleeve rotatably mounted on the pin and bearing against the plate, said frame having a pin disposed at each end thereof and having an arcuate bearing plate concentric with and spaced from said last named pins, spring supporting hangers rotatable on the last named pins and bearing against their associate plates, said hangers having flat bearing plates designed to ride on the ends of two leaf springs, and means for securing the other ends of the leaf springs to the chassis.

JOHN R. KONETSKY.